Patented Nov. 3, 1936

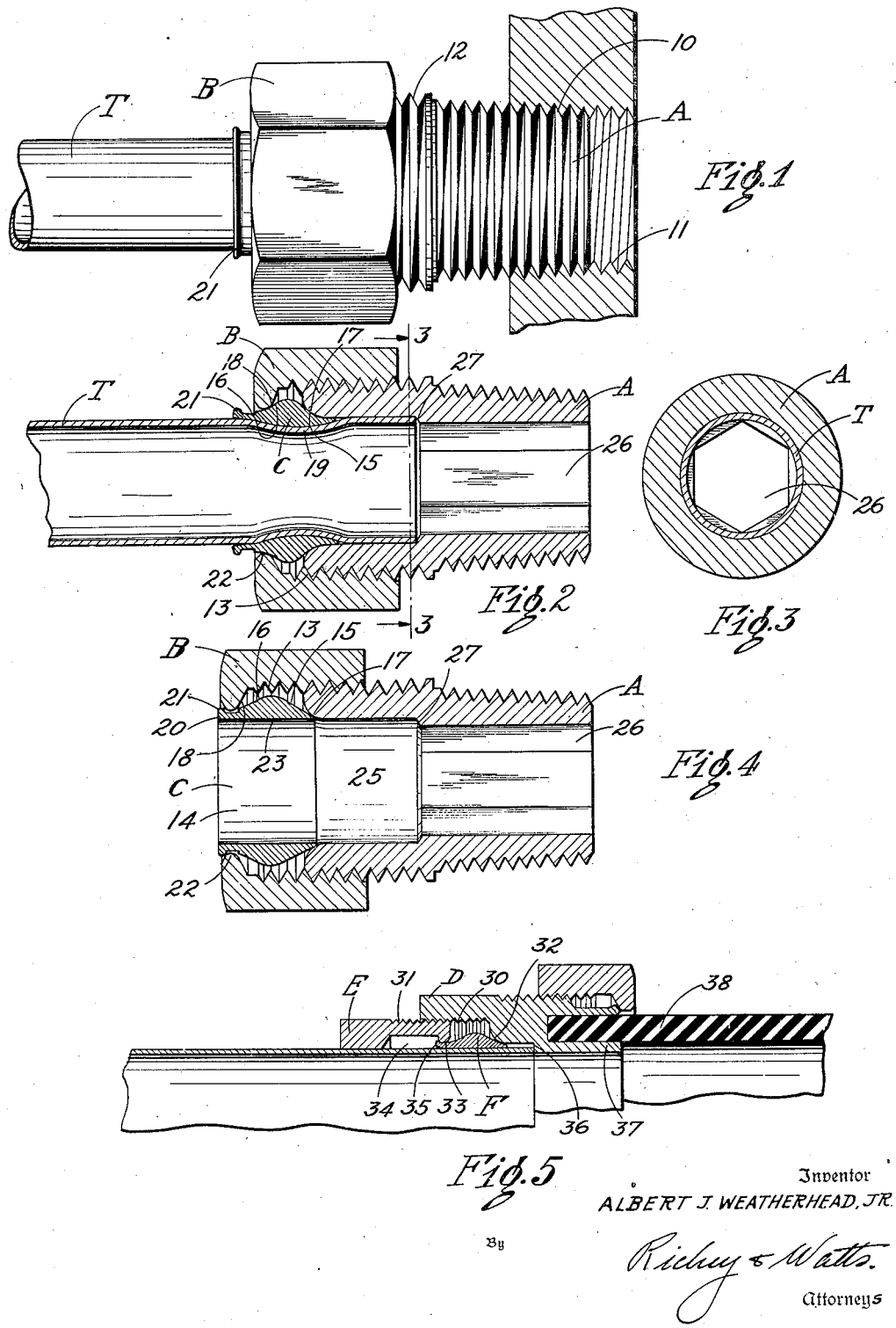

2,059,920

UNITED STATES PATENT OFFICE 2,059,920

COMPRESSION FITTING

Albert J. Weatherhead, Jr., Cleveland, Ohio, assignor to The Weatherhead Company, Cleveland, Ohio, a corporation of Ohio Application April 27, 1934, Serial No. 722,711

3 Claims. (Cl. 285—122)

This invention relates to fittings or couplings for small metallic tubes, and more particularly to fittings of the compression type wherein a small, separately formed collar or sleeve is deformed and compressed into engagement with the tube and the fitting, thus making a leakproof joint.

Fittings of this character have come into considerable use but are open to objection because of the fact that the small sleeves are ordinarily not attached to the fittings or secured in any way until the fittings are placed in use. Such separate sleeves frequently become lost and always must be assembled with the fittings before the fittings can be used.

Accordingly it is among the objects of my invention to provide a compression fitting embodying a fitting or coupling member and a compression nut in which a separately formed deformable sleeve is secured to one of said members. Another object is the provision of such a fitting in which the connection between the nut and the sleeve will be destroyed when the fitting is in use, so that the nut may be removed from the coupling member without disturbing the relationship of the sleeve and the tube. Another object is the provision of a coupling member which can be manufactured at minimum cost, which will be extremely light in weight and which will embody a minimum amount of material. A further object is the provision of a compression coupling which can be rapidly and economically manufactured. A further object is the provision of a compression coupling which can be adapted to a wide variety of uses.

Other objects and advantages of my invention will become apparent from the following description of preferred forms thereof, reference being made to the accompanying drawing. The essential characteristics are summarized in the claims.

In the drawing Figure 1 is a view partially in section illustrating one form of my coupling in use; Figure 2 is a section through the coupling illustrated in Figure 1 and showing a tube secured in the coupling; Figure 3 is a transverse section as indicated by the line 3—3 of Figure 2; Figure 4 is a section showing my coupling and coupling nut in assembled relationship, but before a tube has been secured therein; and Figure 5 is a sectional view through a different adaptation of my coupling showing the coupling member, coupling nut, sleeve and tube in assembled relationship, but before the tube has been secured in position.

As shown in Figures 1 to 4, inclusive, my compression fitting may comprise a coupling member A, a coupling nut B, and a clamping sleeve C which is adapted to be deformed by the coupling member and nut and in turn to compress the tube T inwardly.

The coupling member A is provided with pipe threads 10, for example, which may engage corresponding threads in the recess 11 of any suitable member with which it is desired to make a connection. The coupling member is also provided with a threaded portion 12 which is adapted to engage the internally threaded portion 13 of the coupling nut B. The sleeve C, before it has been used to clamp a tube, has a substantially cylindrical inner surface 14, the internal diameter being substantially the same as the external diameter of the tube T. The outer portion of the sleeve is provided with tapered or wedging surfaces 15 and 16, which are engaged by the curved cam surfaces 17 and 18 of the coupling member A and the nut B respectively. It will be seen that when the nut is advanced along the threads of the coupling member, the cam surfaces will deform the sleeve inwardly into substantially the shape illustrated in Figure 2, and this action will cause the tube to be compressed as at 19. When the coupling member and nut are properly tightened together the sleeve will be compressed into leak-proof engagement with the external surface of the tube, and the surface 15 of the sleeve will have a leak-proof engagement with the curved surface 17 of the coupling member A. Thus there is no possibility of leakage between the tube and the coupling member.

In order to make the fitting easy to use and ship without danger of losing the sleeve, the sleeve is provided with a tail portion 20 extending to the left of the wedging surface 16, as shown in the drawing. The end of the tail portion 20 is enlarged as at 21, (see Fig. 4) its external diameter being slightly greater than the internal diameter of the portion 22 of the coupling nut, thus securing the sleeve against removal from the coupling nut while allowing it to rotate with respect thereto.

The coupling nut and sleeve may be assembled by pressing the sleeve into the nut, the external diameter of the portion 21 of the sleeve being only a few thousandths of an inch greater than the internal diameter of the portion 22 of the nut so that the sleeve will not be permanently deformed to any appreciable extent by the pressing operation.

As shown in Figure 2 of the drawing, the compressing action of the nut reduces the diameter of the tail portion of the sleeve so that after the sleeve has been applied to a tube the portion 22 of the nut will clear the expanded portion 21 of the sleeve. Thus the nut can be removed from the coupling member without disturbing the engagement between the sleeve and the tube in any way, and by reason of this construction the tube can be disconnected from the coupling and reconnected thereto many times without destroying the leak-proof qualities of the joint In order to conserve material and save expense in the manufacture of coupling member A, I prefer to form the member as shown without any hexagonal wrench-engaging external surfaces. In order that the coupling member may be properly tightened up in its support, the inner bore 25 of the coupling member is provided with a non-cylindrical, preferably hexagonal end portion 26 of reduced internal dimensions. By reason of this construction the coupling can be tightened up by inserting a wrench into the bore thereof, and also the non-cylindrical portion 26 provides a shoulder 27 against which the end of the tube T abuts, thus preventing creeping of the tube as the coupling nut is tightened onto the coupling member. By reason of this construction the coupling member can be made from a minimum amount of stock, and will have a minimum weight. The coupling member may be formed from cylindrical rod stock in an automatic screw machine while the wrench-engaging surfaces of the coupling member may be formed by a broaching operation, which also may be carried out in the automatic screw machine.

In Figure 6 of the drawing I have illustrated a modified form of my invention in which the coupling member D is provided with internal threads 30, and the coupling nut E is provided with external threads 31 engageable therewith. The construction of the sleeve F and the forms of the cam surfaces 32 and 33 on the coupling member and coupling nut respectively are substantially the same as previously described in connection with Figures 1 to 4 of the drawing. The coupling nut E is provided with a recessed portion indicated at 34 for receiving the tail 35 of the sleeve. The coupling member D is provided with an internal shoulder 36 against which the end of the tube abuts, and which comprises the end of a nipple 37 adapted to be inserted with a rubber tube 38. In this modification I have illustrated my compression fitting as being adapted to connect a metallic tube to a non-metallic tube such as the rubber tube 38. The particular type of connection between the coupling member and the rubber tube forms no part of the present invention, this being the connection described and claimed in my co-pending application Serial No. 649,833, filed January 3, 1933. It is to be noted, however, that the internal nipple 37 also provides the shoulder against which the end of the tube abuts.

From the foregoing description of various forms of my invention it will be seen that I have provided compression fittings which can be rapidly and economically manufactured, and which can be easily assembled without danger of losing or improperly assembling the compression sleeves. My fittings are leak-proof when properly assembled, and, by reason of the fact that the coupling nuts are completely disconnected from the sleeves after the fittings have been used, the couplings can be disconnected and reconnected many times without impairing the leak-proof qualities of the joints. I have also provided a coupling member embodying a minimum amount of material, and which can be manufactured at a very low cost by reason of the simplicity of the manufacturing operations, and the small amount of material required.

It will be evident to persons skilled in the art that my invention can be adapted to various other uses and situations, and that various changes and modifications can be made all within the scope and spirit of my invention. It is therefore to be understood that my patent is not limited to the modifications disclosed herein, or in any manner other than by the scope of the appended claims when given the range of equivalents to which my patent may be entitled.

I claim:

1. A compression fitting comprising a coupling member having a threaded portion and a central bore adapted to receive a tube, a compression nut having a central bore and a threaded portion adapted to engage the threaded portion of the coupling member, a separately formed solid deformable sleeve adapted to be deformed into engagement with a tube within said coupling member and said compression nut, and means for securing said sleeve to said coupling nut, said means comprising a tail portion on said sleeve adapted to project within said compression nut and having an end portion of enlarged external diameter adapted to engage a shoulder on said nut, the diameter of the end portion being permanently reduced when the sleeve is deformed whereby the sleeve is detached from the nut.

2. A compression fitting comprising a coupling member having an externally threaded portion and a central bore adapted to receive a tube and having an angular wrench receiving portion forming a shoulder adapted to engage the end of the tube, a compression nut having a central bore and an internally threaded portion adapted to engage the threaded portion of the coupling member, a separately formed solid deformable sleeve adapted to be deformed into engagement with a tube within said coupling member and said compression nut, and means for securing said sleeve to said coupling nut comprising a tail portion on said sleeve adapted to project through the central bore of said coupling nut and having an end portion of enlarged external diameter adapted to engage a shoulder on said nut, the diameter of the end portion being permanently reduced when the sleeve is deformed whereby the sleeve is detached from the nut.

3. A compression fitting comprising a coupling member having an internally threaded portion and a central portion adapted to receive a tube, a compression nut having a central bore, an externally threaded portion adapted to engage the threaded portion of the coupling member, and an enlarged annular recess adjacent the central bore, a separately formed solid deformable sleeve adapted to be deformed into engagement with a tube within said coupling member and compression nut, and means for securing said sleeve to said coupling nut comprising a tail portion on said sleeve adapted to project within the annular recess of said compression nut and having an end portion of enlarged external diameter adapted to engage a shoulder on said nut, the diameter of the end portion being permanently reduced when the sleeve is deformed whereby the sleeve is detached from the nut.

ALBERT J. WEATHERHEAD, Jr.